(12) United States Patent
Bai et al.

(10) Patent No.: US 12,536,470 B2
(45) Date of Patent: Jan. 27, 2026

(54) FEDERATED LEARNING MODEL SPLITTING AND COMBINING

(71) Applicant: QUALCOMM Incorporated, San Diego, CA (US)

(72) Inventors: Tianyang Bai, Somerville, NJ (US); Hua Wang, Basking Ridge, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 1006 days.

(21) Appl. No.: 17/652,909

(22) Filed: Feb. 28, 2022

(65) Prior Publication Data
US 2023/0274181 A1    Aug. 31, 2023

(51) Int. Cl.
*G06N 20/00*    (2019.01)
*H04W 24/02*    (2009.01)

(52) U.S. Cl.
CPC ............ *G06N 20/00* (2019.01); *H04W 24/02* (2013.01)

(58) Field of Classification Search
CPC ........ G06N 20/00; G06N 3/098; G06N 3/045; H04W 24/02
See application file for complete search history.

(56) References Cited

U.S. PATENT DOCUMENTS

| | | | |
|---|---|---|---|
| 2023/0325679 A1* | 10/2023 | Wang | G06N 3/045 706/25 |
| 2024/0256898 A1* | 8/2024 | Ren | G06N 3/098 |
| 2024/0378457 A1* | 11/2024 | Satheesh Kumar | G06N 3/098 |
| 2025/0030612 A1* | 1/2025 | Guan | H04W 24/02 |
| 2025/0031066 A1* | 1/2025 | Moosavi | H04L 41/16 |
| 2025/0071575 A1* | 2/2025 | Rydén | H04B 17/346 |

* cited by examiner

*Primary Examiner* — Dhaval V Patel
(74) *Attorney, Agent, or Firm* — Guang Y. Zhang; Harrity & Harrity, LLP

(57) ABSTRACT

Various aspects of the present disclosure generally relate to wireless communication. In some aspects, a network node may receive, from a first user equipment (UE) and a second UE, one or more parameter updates associated with a first model for federated learning. The network node may transmit, to the first UE, a second model for federated learning that is based at least in part on the first model. The network node may transmit, to the second UE, a third model for federated learning that is based at least in part on the first model. Numerous other aspects are described.

30 Claims, 11 Drawing Sheets

FEDERATED LEARNING MODEL SPLITTING AND COMBINING

FIELD OF THE DISCLOSURE

Aspects of the present disclosure generally relate to wireless communication and to techniques and apparatuses for federated learning model splitting and combining.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LIE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a network node. The method may include receiving, from a first user equipment (UE) and a second UE, one or more parameter updates associated with a first model for federated learning. The method may include transmitting, to the first UE, a second model for federated learning that is based at least in part on the first model. The method may include transmitting, to the second UE, a third model for federated learning that is based at least in part on the first model.

Some aspects described herein relate to a method of wireless communication performed by a network node. The method may include receiving, from a first UE, a first parameter update associated with a first model for federated learning. The method may include receiving, from a second UE, a second parameter update associated with a second model for federated learning. The method may include transmitting, to the first UE and the second UE, a third model for federated learning that is based at least in part on the first model and the second model.

Some aspects described herein relate to an apparatus for wireless communication performed by a network node. The apparatus may include a memory and one or more processors, coupled to the memory. The one or more processors may be configured to receive, from a first UE and a second UE, one or more parameter updates associated with a first model for federated learning. The one or more processors may be configured to transmit, to the first UE, a second model for federated learning that is based at least in part on the first model. The one or more processors may be configured to transmit, to the second UE, a third model for federated learning that is based at least in part on the first model.

Some aspects described herein relate to an apparatus for wireless communication performed by a network node. The apparatus may include a memory and one or more processors, coupled to the memory. The one or more processors may be configured to receive, from a first UE, a first parameter update associated with a first model for federated learning. The one or more processors may be configured to receive, from a second UE, a second parameter update associated with a second model for federated learning. The one or more processors may be configured to transmit, to the first UE and the second UE, a third model for federated learning that is based at least in part on the first model and the second model.

Some aspects described herein relate to a non-transitory computer-readable medium that stores a set of instructions for wireless communication by a network node. The set of instructions, when executed by one or more processors of the network node, may cause the network node to receive, from a first UE and a second UE, one or more parameter updates associated with a first model for federated learning. The set of instructions, when executed by one or more processors of the network node, may cause the network node to transmit, to the first UE, a second model for federated learning that is based at least in part on the first model. The set of instructions, when executed by one or more processors of the network node, may cause the network node to transmit, to the second UE, a third model for federated learning that is based at least in part on the first model.

Some aspects described herein relate to a non-transitory computer-readable medium that stores a set of instructions for wireless communication by a network node. The set of instructions, when executed by one or more processors of the network node, may cause the network node to receive, from a first UE, a first parameter update associated with a first model for federated learning. The set of instructions, when executed by one or more processors of the network node, may cause the network node to receive, from a second UE, a second parameter update associated with a second model for federated learning. The set of instructions, when executed by one or more processors of the network node, may cause the network node to transmit, to the first UE and the second UE, a third model for federated learning that is based at least in part on the first model and the second model.

Some aspects described herein relate to an apparatus for wireless communication. The apparatus may include means for receiving, from a first UE and a second UE, one or more parameter updates associated with a first model for federated learning. The apparatus may include means for transmitting, to the first UE, a second model for federated learning that is based at least in part on the first model. The apparatus may include means for transmitting, to the second UE, a third model for federated learning that is based at least in part on the first model.

Some aspects described herein relate to an apparatus for wireless communication. The apparatus may include means for receiving, from a first UE, a first parameter update associated with a first model for federated learning. The apparatus may include means for receiving, from a second UE, a second parameter update associated with a second model for federated learning. The apparatus may include means for transmitting, to the first UE and the second UE, a third model for federated learning that is based at least in part on the first model and the second model.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
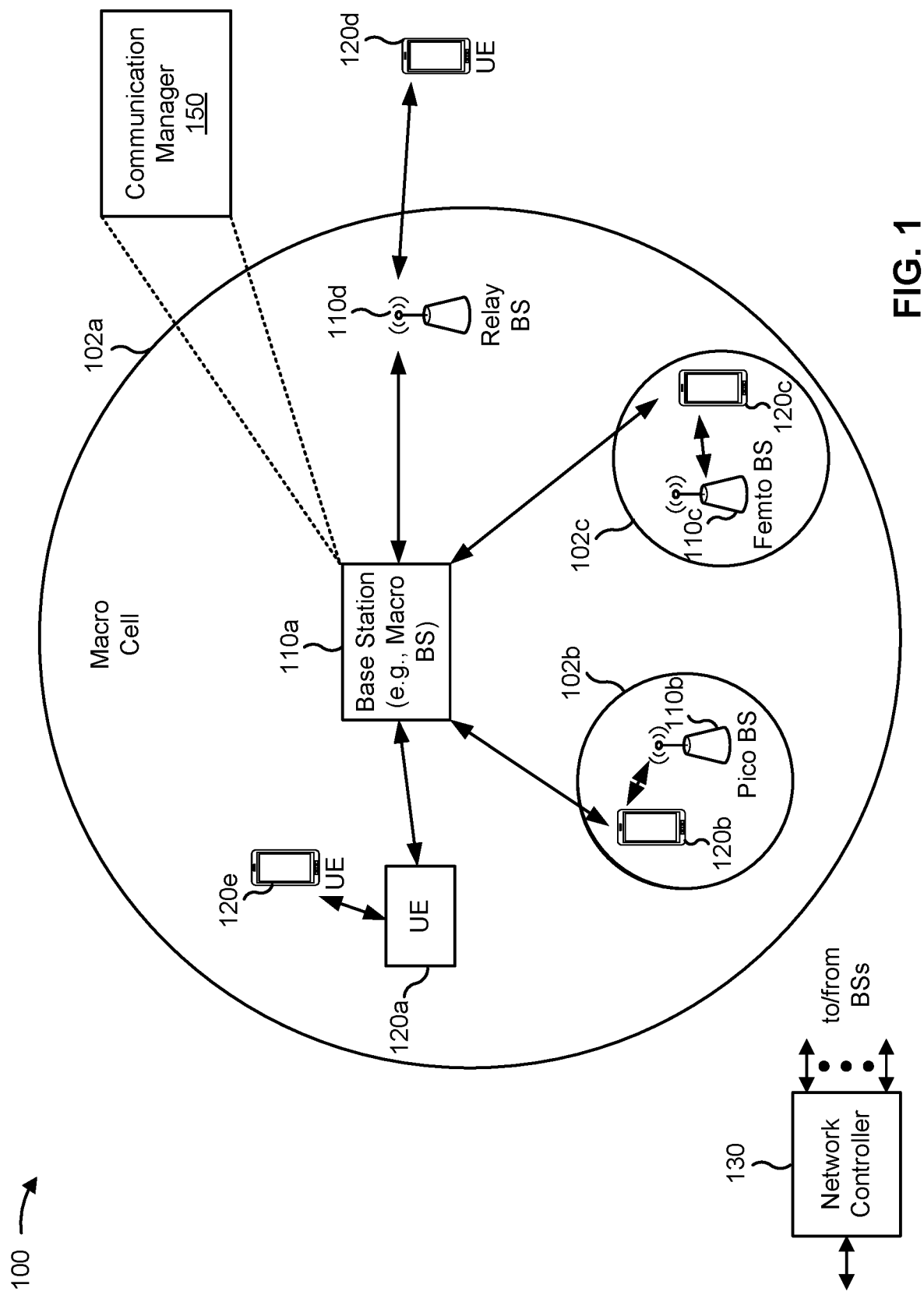
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Moreover, although depicted as an integral unit in FIG. 1, aspects of the disclosure are not so limited. In some other aspects, the functionality of the base station 110 may be disaggregated according to an open radio access network (RAN) (O-RAN) architecture or the like, which is described in more detail in connection with FIG. 3. Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the network node may include a communication manager 150. As described in more detail elsewhere herein, the communication manager 150 may receive, from a first UE and a second UE, one or more parameter updates associated with a first model for federated learning; transmit, to the first UE, a second model for federated learning that is based at least in part on the first model; and transmit, to the second UE, a third model for federated learning that is based at least in part on the first model. Additionally, or alternatively, the communication manager 150 may perform one or more other operations described herein.

In some aspects, the communication manager 150 may receive, from a first UE, a first parameter update associated with a first model for federated learning; receive, from a second UE, a second parameter update associated with a second model for federated learning; and transmit, to the first UE and the second UE, a third model for federated learning that is based at least in part on the first model and the second model. Additionally, or alternatively, the communication manager 150 may perform one or more other operations described herein.

As indicated above, FIG. 1 is provided as an example. Other examples may differ from what is described with regard to FIG. 1.

Figure 2:
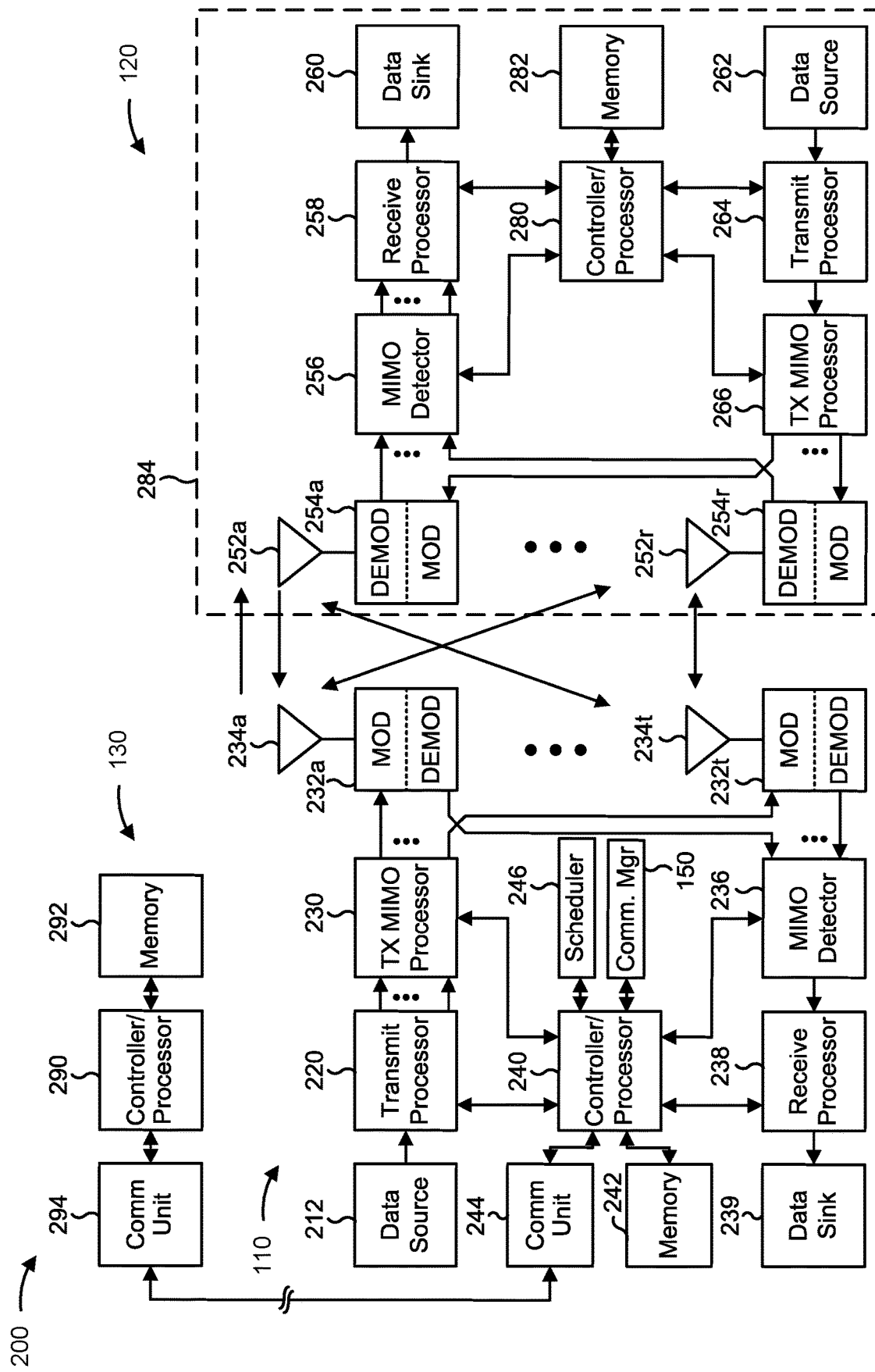
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-11).

The controller/processor 240 of the base station 110, the controller/processor 280 of the UE 120, and/or any other component(s) of FIG. 2 may perform one or more techniques associated with federated learning model splitting and combining, as described in more detail elsewhere herein. In some aspects, the network node described herein is the UE 120, is included in the UE 120, or includes one or more components of the UE 120 shown in FIG. 2. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the network node 505 includes means for receiving, from a first UE and a second UE, one or more parameter updates associated with a first model for federated learning; means for transmitting, to the first UE, a second model for federated learning that is based at least in part on the first model; and/or means for transmitting, to the second UE, a third model for federated learning that is based at least in part on the first model. In some aspects, the means for the network node 505 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the network node 505 includes means for receiving, from a first UE, a first parameter update associated with a first model for federated learning; means for receiving, from a second UE, a second parameter update associated with a second model for federated learning; and/or means for transmitting, to the first UE and the second UE, a third model for federated learning that is based at least in part on the first model and the second model. In some aspects, the means for the network node 505 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
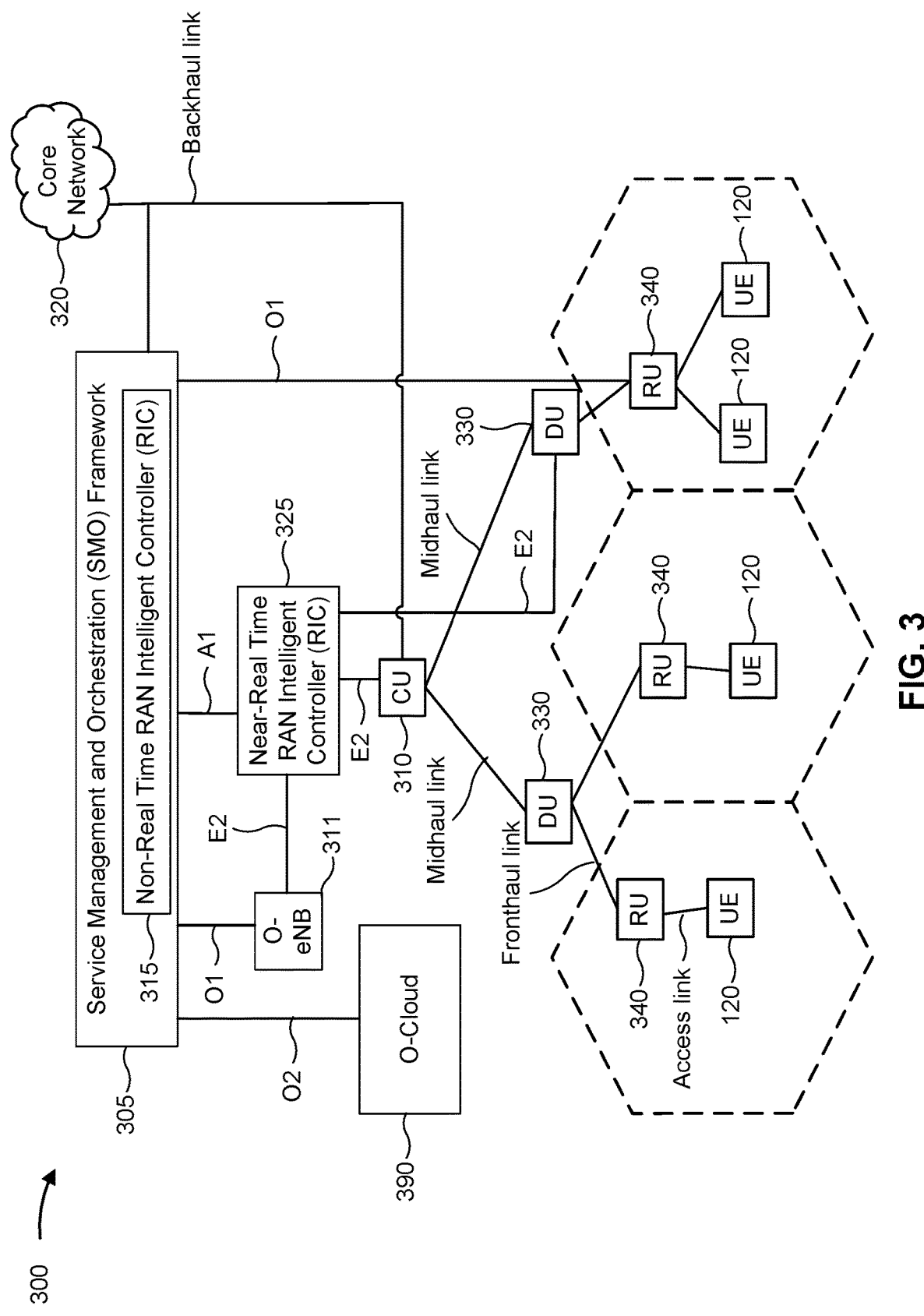
FIG. 3 is a diagram illustrating an example disaggregated base station architecture, in accordance with the present disclosure.

FIG. 3 is a diagram illustrating an example 300 disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit—User Plane (CU-UP)), control plane functionality (e.g., Central Unit—Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an AI interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as AI policies).

As indicated above, FIG. 3 is provided as an example. Other examples may differ from what is described with regard to FIG. 3.

Figure 4:
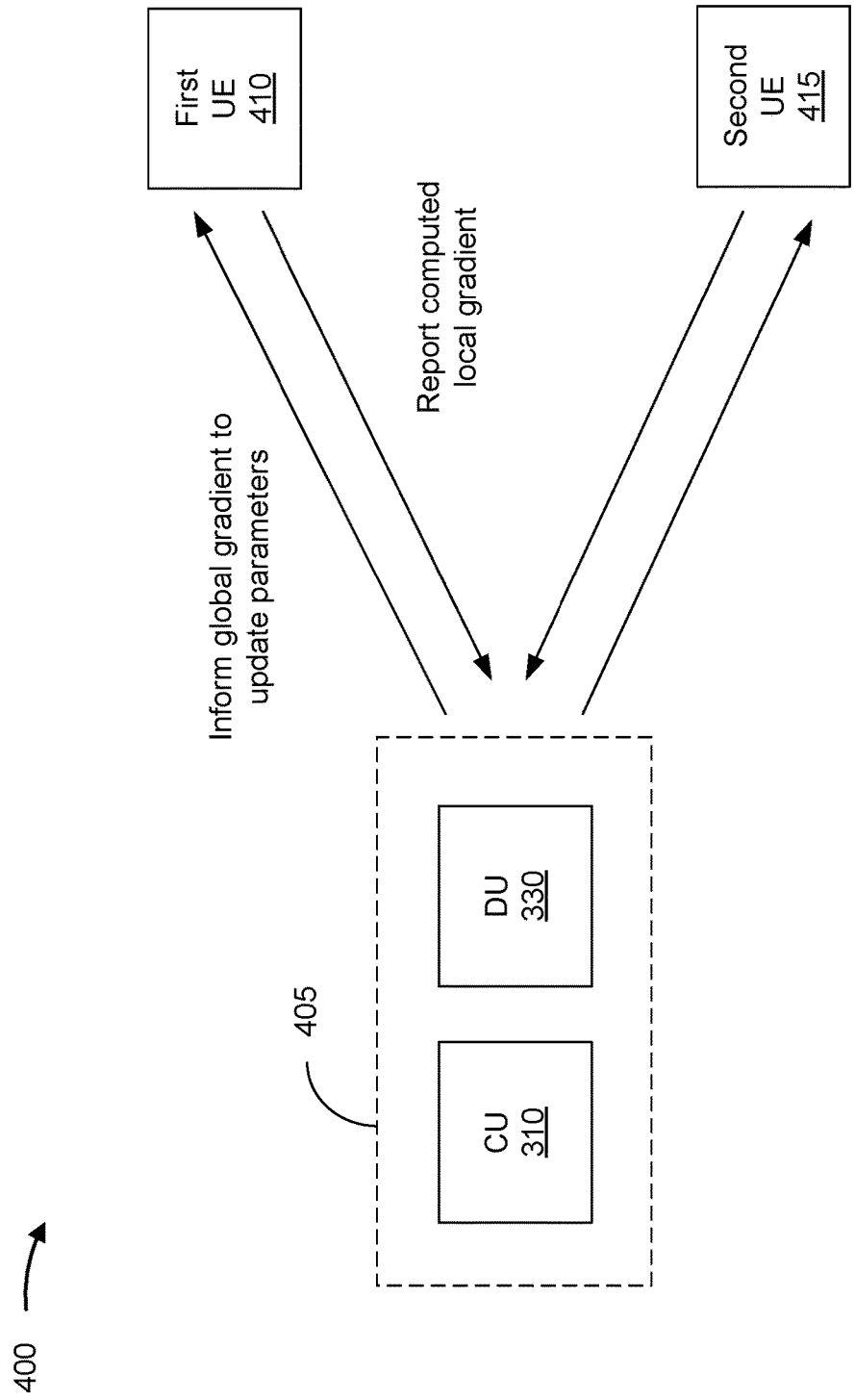
FIG. 4 is a diagram illustrating an example of federated learning, in accordance with the present disclosure.

FIG. 4 is a diagram illustrating an example 400 of federated learning, in accordance with the present disclosure. A network node 405 may communicate with a first UE 410 and a second UE 415. The network node 405 may include some or all of the features of the base station 110. In some aspects, the network node 405 may be a disaggregated network node 405, as described above in connection with FIG. 3. For example, the network node 405 may be the CU 310, or may include the CU 310, or may be the DU 330, or may include the DU 330. The first UE 410 and the second UE 415 may include some or all of the features of the UE 120.

In some cases, a model for federated learning may enable multiple UEs (such as the first UE 410 and the second UE 415) to be configured with a common model, and to use local computation power to help refine the model. In some cases, the model may be a neural network model. For example, the model may be used for keyword prediction, voice prediction, or for predicting future reference signal received power (RSRP) measurements based at least in part on previous RSRP measurements for different beams in an area. In some cases, the model may be refined, such as by computing updates in the model to reduce error rates.

In some cases, different UEs may have access to different sets of data that can be used to compute a local update of the model. For example, the first UE 410 may compute a first local update (e.g., gradient) of the model based at least in part on data available to the first UE 410, and the second UE 415 may compute a second local update of the model based at least in part on data available to the second UE 415.

In some cases, the update to the model for federated learning may occur in iterations. For example, the first UE 410 and the second UE 415 may each compute a local gradient using local data, and may send the local gradients to the network node 405. The network node 405 may compute a global update using the local updates from the first UE 410 and the second UE 415. The network node 405 may transmit the global update to each of the first UE 410 and the second UE 415. After receiving the global update, each of the first UE 410 and the second UE 415 may compute a next local update using the updated model and additional local data.

In some cases, the federated learning model may provide a number of advantages. For example, federated learning may enable back-propagation that is computed locally at the edge nodes (e.g., the first UE 410 and the second UE 415). In some cases, federated learning may allow for better user privacy. For example, the first UE 410 and the second UE 415 may only feed back parameter updates to the network node 405, without sending the raw data (e.g., without sending any raw data, or only sending a portion of the raw data). However, the federated learning model may be associated with certain drawbacks. For example, the network node 405 may not have a full picture of the data. Instead, the local data may be stored at the first UE 410 and the second UE 415. In some cases, the model may be run at the edge nodes, which may have limited processing and memory capabilities. Thus, the size of the model may be limited.

In some cases, since the network node 405 does not have access to the raw or local data, the network node 405 may not be able to adjust the model (e.g., the neural network size and architecture). In some cases, it may be difficult for the network node 405 to estimate if the model works well for a specific user group, or if the network node 405 should train a separate (e.g., smaller) model for the group. Additionally, or alternatively, it may be difficult for the network node 405 to determine if two UE groups under different models have similar distributions, or if maintaining a single model would work more efficiently.

In a first example, data from two groups of UEs (e.g., a first group of UEs that includes the first UE 410, and a second group of UEs that includes the second UE 415) may follow different distributions, but a single model may be trained for the two groups. In some cases, the model may be trained with a large size to incorporate both data distributions. However, as described above, the size of the model may be limited in federated learning (e.g., due to the capabilities of the edge nodes). In some cases, the network node 405 may check the distributions of data periodically, and may decide to train two separate models if training the single model for both groups requires too many resources. However, in federated learning, the network node 405 may not have access to the data of the other nodes (e.g., the edge nodes), so there may be no easy way to split the model.

In a second example, two models may be trained for the two groups of UEs (e.g., the first group and the second group), but the data distributions of the UEs may be similar. In this case, training a single model using data from the two groups of UEs may be more efficient. In a centralized learning case, the network node 405 may be configured to check the two pools of data and to decide whether to combine the models. However, in federated learning, the network node 405 may not have access to the data of the other nodes (e.g., the edge nodes), so there may be no easy way to combine the models.

Techniques and apparatuses are described herein for federated learning model splitting and combining. In some aspects, a network node may receive, from a first UE and a second UE, one or more parameter updates associated with a first model for federated learning. The network node may generate a second model for federated learning and a third model for federated learning based at least in part on the first model. For example, the network node may split the first model into the second model and the third model based at least in part on determining that the first UE and the second UE follow different distributions using the first model. The network node may transmit the second model to the first UE and the third model to the second UE.

In some aspects, the network node may receive, from a first UE, a first parameter update associated with a first model for federated learning or a second model for federated learning, and may receive, from a second UE, a second parameter update associated with the first model or the second model. The network node may generate a third model for federated learning based at least in part on the first model and the second model. For example, the network node may combine the first model and the second model to generate the third model based at least in part on determining that the first UE and the second UE follow similar distributions using the first model or the second model. The network node may transmit the third model to the first UE and the second UE.

As described above, the network node may not be able to easily adjust or update federated learning models since the network node does not have access to the raw or local data. In some cases, it may not be possible to perform model splitting or combining without the raw or local data. Using the techniques and apparatuses described herein, the network node may be configured to perform model splitting or combining using parameter updates, such as gradient updates or error metrics, received from the individual UEs. This may allow the network node to perform the model splitting or combining even though the network node does not have access to the raw or local data. Thus, the benefits of federated learning, such as local computing and data privacy, may be maintained, while the drawbacks, such as the difficulty in performing model updating, may be reduced or eliminated.

As indicated above, FIG. 4 is provided as an example. Other examples may differ from what is described with regard to FIG. 4.

Figure 5:
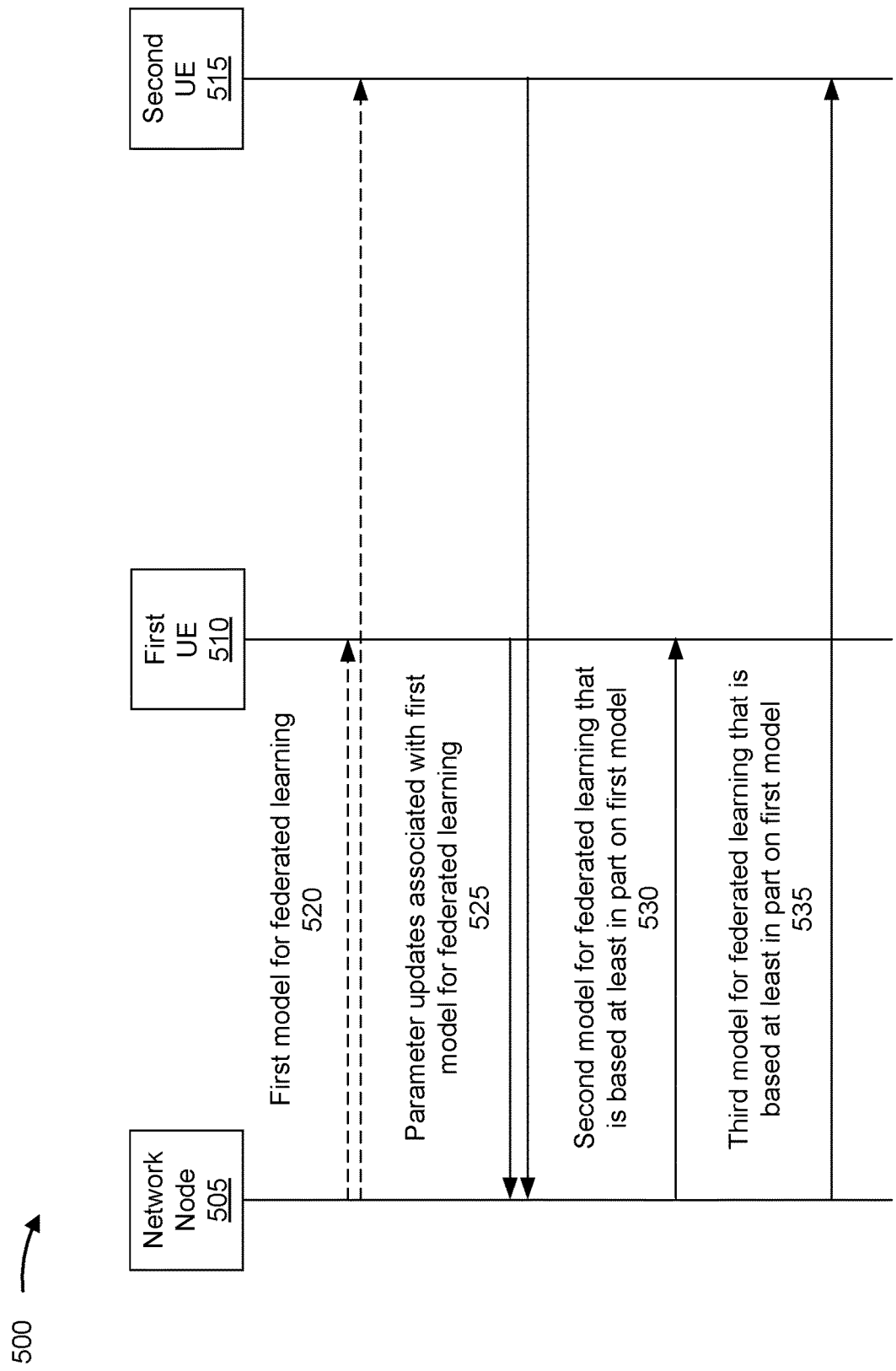
FIG. 5 is a diagram illustrating an example associated with model splitting, in accordance with the present disclosure.

FIG. 5 is a diagram illustrating an example 500 of model splitting, in accordance with the present disclosure. A network node 505 may communicate with a first UE 510 and a second UE 515. The network node 505 may include some or all of the features of the network node 405 or the base station 110. The first UE 510 and the second UE 515 may include some or all of the features of the UE 120, the first UE 410, or the second UE 415.

As shown in connection with reference number 520, the network node 505 may configure the first UE 510 and the second UE 515 with a first model for federated learning. For example, the network node 505 may transmit, and the first UE 510 may receive, the first model for federated learning. Additionally, or alternatively, the network node 505 may transmit, and the second UE 515 may receive, the first model for federated learning. The first model for federated learning may include some or all of the features of the model (e.g., the neural network model) described above in connection with FIG. 4. In some aspects, the first model for federated learning may be used by the first UE 510 or the second UE 515 to improve communication performance. For example, the first model may be a neural network model that is used to predict a channel or to assist in beam measurement.

As shown in connection with reference number 525, the network node 505 may receive one or more parameter updates associated with the first model for federated learning. For example, the first UE 510 may transmit, and the network node 505 may receive, a first parameter update associated with the first model. Additionally, or alternatively, the second UE 515 may transmit, and the network node 505 may receive, a second parameter update associated with the first model.

In some aspects, the parameter update may be a gradient update. The gradient update may correspond to a difference between a target output and an output of the model using local data. For example, the first UE 510 may obtain a first output based at least in part on running the model with local data associated with the first UE 510, and may compute a first gradient update based at least in part on comparing the first output with the target output. Additionally, or alternatively, the second UE 515 may obtain a second output based at least in part on running the model with local data associated with the second UE 515, and may compute a second gradient update based at least in part on comparing the second output with the target output (e.g., the same target output or a different target output).

In some aspects, the network node 505 may be configured to cluster (e.g., group) the parameter updates, and to make decisions based at least in part on the clustering. For example, the network node 505 may generate a group of gradient updates based at least in part on the first gradient update, received from the first UE 510, and the second gradient update, received from the second UE 515. The network node 505 may determine whether to split the first model based at least in part on the group of gradient updates.

In some aspects, the network node 505 may compute an average gradient update. For example, the network node 505 may compute an average gradient update based at least in part on the group of gradient updates. In some aspects, the network node 505 may compute a difference between the average gradient update and a received gradient update. For example, the network node 505 may receive the first gradient update from the first UE 510, and may compute a difference between the first gradient update and the average gradient update. Additionally, or alternatively, the network node 505 may receive the second gradient update from the second UE 515, and may compute a difference between the second gradient update and the average gradient update. The network node 505 may update the model (or determine to split the model) based at least in part on computing the differences between the average gradient update and the received gradient updates. In some aspects, computing the difference between the average gradient update and the received gradient update may comprise determining a cosine distance of the gradient update from the average gradient update.

In some aspects, the gradient update associated with a UE may frequently fall outside of the clustering center. For example, the first gradient update associated with the first UE 510 may frequently be greater than, or greater than or equal to, a threshold distance from the average gradient update. Additionally, or alternatively, the second gradient update associated with the second UE 515 may frequently be greater than, or greater than or equal to, the threshold distance (the same threshold distance, or a different threshold distance) from the average gradient update. This may indicate that the first UE 510 or the second UE 515 may not work with the rest of the UEs in the group (e.g., the rest of the UEs configured with the first model). For example, the data distributions of the first UE 510 or the second UE 515 may be different from the data distributions of the other UEs in the group. In this case, the network node 505 may determine to perform model splitting.

In some aspects, the network node 505 may configure the first UE 510 or the second UE 515 with one or more parameters for computing an error metric based at least in part on the first model. For example, the first UE 510 may run the first model with the first local data associated with the first UE 510, and may compute a first error metric based at least in part on comparing the output of the model with the one or more parameters. Additionally, or alternatively, the second UE 515 may run the first model with the second local data associated with the second UE 515, and may compute a second error metric based at least in part on comparing the output of the model with the one or more parameters. The first UE 510 and the second UE 515 may transmit the first error metric and the second error metric, respectively, to the network node 505. In some aspects, the error metric have a lower dimension than the gradient update. For example, the error metric may have lower complexity than the gradient update, or may be smaller in size as compared to the gradient update. In some aspects, the error metric may correspond to a mean square error (MSE) value loss between the model output and a target output.

In some aspects, the network node 505 may transmit a threshold error metric to some or all of the UEs configured with the first model, such as the first UE 510 and the second UE 515. In some aspects, the transmission may be a broadcast transmission. For example, the network node 505 may broadcast an average error metric that is based at least in part on a previously received error metric or a target value associated with a performance requirement. In this case, the first UE 510 and the second UE 515 may only report respective error metrics when the error metrics satisfy a criterion. For example, the first UE 510 or the second UE 515 may only report the error metric if the error metric is larger than a threshold error metric (e.g., the average error metric) for a certain number of updates.

In some aspects, the network node 505 may generate a second model for federated learning and a third model for federated learning based at least in part on the first model. Generating the second model and the third model may comprise splitting the first model into the second model and the third model. For example, the second model may include a portion of the first model, and may be transmitted to a portion of the UEs that were configured with the first model. Similarly, the third model may include another portion of the first model, and may be transmitted to another portion of the UEs that were configured with the first model.

In some aspects, the network node 505 may generate the second model and the third model based at least in part on one or more conditions being satisfied. For example, the network node 505 may generate the second model and the third model based at least in part on a received gradient update being greater than a threshold distance from an average gradient update, or greater than or equal to the threshold distance from the average gradient update. Additionally, or alternatively, the network node 505 may generate the second model and the third model based at least in part on a received error metric being greater than a threshold error metric, or greater than or equal to the threshold error metric.

In some aspects, generating the second model and the third model may comprise splitting one or more layers of the first model. Additional details regarding this feature are described below in connection with FIG. 7.

As shown in connection with reference number 530, the network node 505 may transmit, and the first UE 510 may receive, the second model for federated learning. In some aspects, the network node 505 may transmit the second model to the first UE 510 based at least in part on the first UE 510 having certain characteristics. For example, the network node 505 may transmit the second model to the first UE 510 based at least in part on an error metric associated with the first UE 510 being greater than a threshold, or greater than or equal to the threshold.

As shown in connection with reference number 535, the network node 505 may transmit, and the second UE 515 may receive, the third model for federated learning. In some aspects, the network node 505 may transmit the third model to the second UE 515 based at least in part on the second UE 515 having certain other characteristics. For example, the network node 505 may transmit the third model to the second UE 515 based at least in part on an error metric associated with the second UE 515 being less than a threshold, or less than or equal to the threshold.

In some aspects, once the network node 505 determines to split the first model into the second model and the third model, the network node 505 may run a classification algorithm to break the UEs into groups. For example, the UEs may be broken into groups based at least in part on the associated gradient updates or error metrics, as described above. The network node 505 may generate the second model and the third model based at least in part on breaking the UEs into the groups. For example, the network node 505 may determine a first group of UEs (including the first UE 510) having certain characteristics, may generate the second model for the first group of UEs, and may transmit the second model to the first group of UEs. Similarly, the network node 505 may determine a second group of UEs (including the second UE 515) having certain other characteristics, may generate the third model for the second group of UEs, and may transmit the third model to the second group of UEs. In some aspects, the network node 505 may maintain training processes for the groups of UEs. For example, the network node 505 may maintain a first training process for the first group of UEs and a second training process for the second group of UEs.

In an example, the first model may be used to predict future RSRP values based at least in part on past RSRP values, such as by using recurrent neural networks (RNN) and/or long short-term memory (LSTM). In some aspects, the prediction error in a large urban area may not be uniform due to the large neural network size. For example, the RSRPs in different locations may have different distributions due to the environments. In some aspects, if the original model is split into smaller models (as described herein), the smaller models may be able to predict RSRP values well within each of the smaller areas. Assuming the network node 505 has all of the RSRP data, the network node 505 may be able to split the area based at least in part on classification algorithms, as described above. For example, the network node 505 may use feedback error and location information from the first UE 510 or the second UE 515 to determine how to split the larger area into multiple smaller areas.

As described above, the network node 505 may not be able to easily adjust or update federated learning models since the network node 505 does not have access to the raw or local data. In some cases, it may not be possible to perform model splitting without the raw or local data. Using the techniques and apparatuses described herein, the network node 505 may be configured to perform model splitting using parameter updates, such as gradient updates or error metrics, received from the first UE 510 and the second UE 515. This may allow the network node 505 to perform the model splitting even though the network node 505 does not have access to the raw or local data. Thus, the benefits of federated learning, such as local computing and data privacy, may be maintained, while the drawbacks, such as the difficulty in performing model updating, may be reduced or eliminated.

As indicated above, FIG. 5 is provided as an example. Other examples may differ from what is described with regard to FIG. 5.

Figure 6:
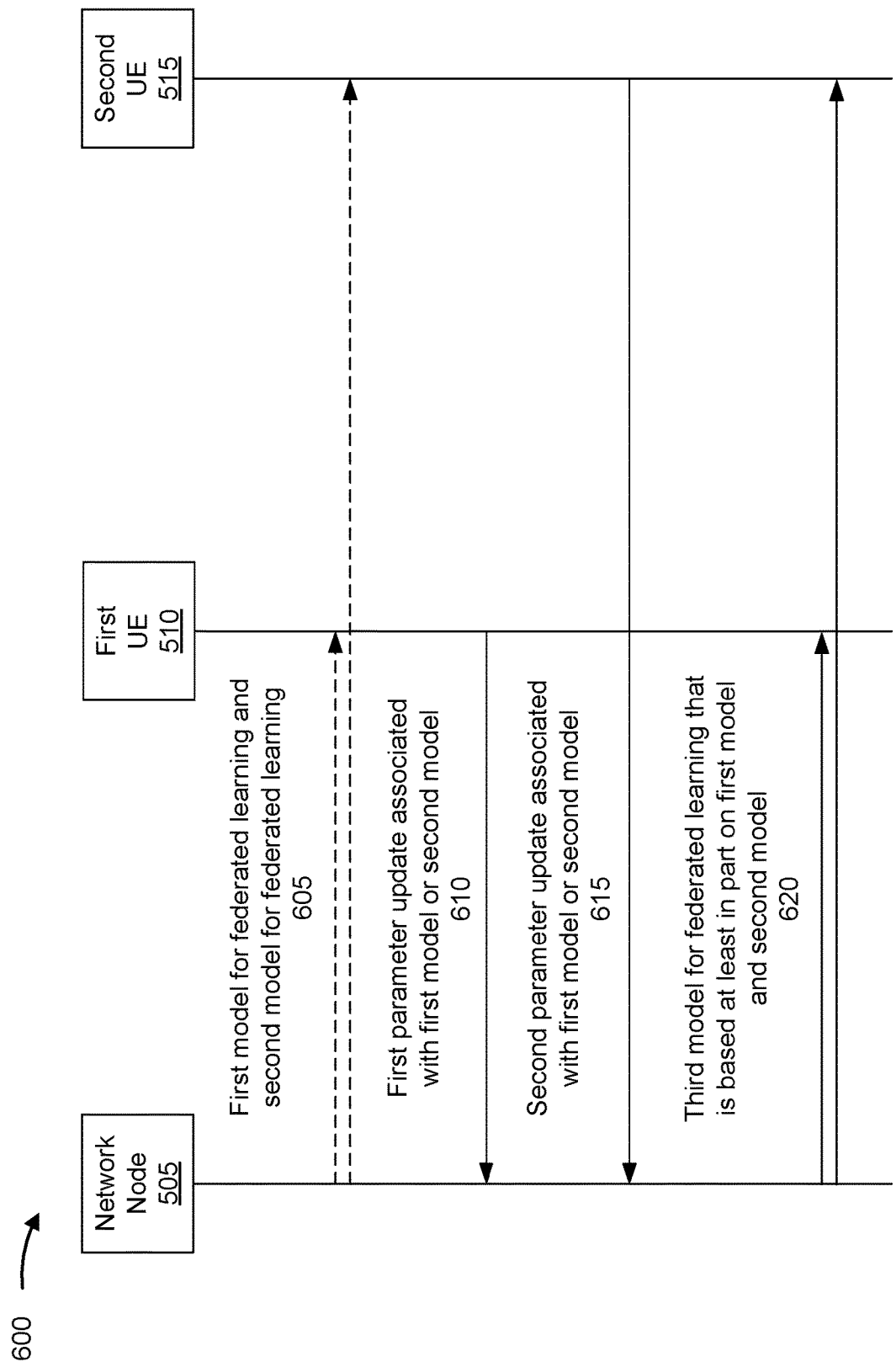
FIG. 6 is a diagram illustrating an example associated with model combining, in accordance with the present disclosure.

FIG. 6 is a diagram illustrating an example 600 of model combining, in accordance with the present disclosure.

As shown in connection with reference number 605, the network node 505 may transmit a first model for federated learning and a second model for federated learning. For example, the network node 505 may transmit, and the first UE 510 may receive, the first model and/or the second model. Additionally, or alternatively, the network node 505 may transmit, and the second UE 515 may receive, the first model and/or the second model.

In some aspects, the first model may be the primary model for the first UE 510. For example, the first UE 510 may run the first model with first local data associated with the first UE 510. The first UE 510 may generate a first parameter update based at least in part on the first model, as described above in connection with reference number 525 of FIG. 5. In this case, the first UE 510 may be configured only with the first model, or with both the first model and the second model.

In some aspects, the second model may be the primary model for the second UE 515. For example, the second UE 515 may run the second model with second local data associated with the second UE 515. The second UE 515 may generate a second parameter update associated with the second model. In this case, the second UE 515 may be configured only with the second model, or with both the first model and the second model.

In some aspects, the network node 505 may configure the first UE 510 and the second UE 515 with the first model and the second model. In this case, the first UE 510 may be configured with both the first model and the second model, and the second UE 515 may be configured with both the first model and the second model. The first model may be the primary model for the first UE 510 and the second model may be the primary model for the second UE 515.

In some aspects, the network node 505 may transmit information that enables the first UE 510 to compute one or more parameter updates for the second model. In some aspects, the network node 505 may transmit information that enables the first UE 510 to compute a gradient update associated with the second model. In some aspects, the network node may transmit information that enables the first UE 510 to compute an error metric associated with the second model. In some aspects, the parameter update may correspond to a cosine distance of the gradient update from an average gradient update. In some aspects, the parameter update may correspond to an MSE loss between the output of the first UE 510 and a target output.

In some aspects, the network node 505 may transmit information that enables the second UE 515 to compute one or more parameter updates for the first model. The information transmitted to the second UE 515 for computing the parameter updates for the first model may be similar to the information transmitted to the first UE 510 for computing the parameter updates for the second model. For example, the information may be the same type of information, with the same values or with different values (e.g., different values for computing a gradient update or an error metric).

The information described above for enabling the first UE 510 to compute the one or more parameter updates for the second model, and for enabling the second UE 515 to compute the parameter updates for the first model, is exemplary only, and may include any type of information, including but not limited to the information described above in connection with FIG. 5.

As shown in connection with reference number 610, the first UE 510 may transmit, and the network node 505 may receive, a first parameter update associated with the first model. As described herein, the first parameter update may be a gradient update, or an error metric, among other examples. The first model may be the primary model associated with the first UE 510, or may be a model associated with another UE such as the second UE 515.

As shown in connection with reference number 615, the second UE 515 may transmit, and the network node 505 may receive, a second parameter update associated with the second model. As described herein, the second parameter update may be a gradient update, or an error metric, among other examples. The second model may be the primary model associated with the second UE 515, or may be a model associated with another UE such as the first UE 510.

As shown in connection with reference number 620, the network node 505 may transmit a third model for federated learning to both the first UE 510 and the second UE 515.

In some aspects, the network node 505 may generate the third model based at least in part on the first model and the second model. For example, the network node 505 may generate the third model based at least in part on combining the first model and the second model.

In some aspects, the network node 505 may generate the third model based at least in part on the first parameter update or the second parameter update. For example, the network node 505 may determine, based at least in part on the first parameter update and the second parameter update, that the data distributions for the first UE 510 and the second UE 515 are similar. In some aspects, the network node 505 may receive parameter updates from the first UE 510 associated with the first model and the second model. Additionally, or alternatively, the network node 505 may receive parameter updates from the second UE 515 associated with the first model and the second model. The network node 505 may determine, based at least in part on the parameter updates, that training a single model for use by the first UE 510 and the second UE 515 may be more efficient.

In some aspects, the network node 505 may combine a first group of UEs (including the first UE 510) that are using the first model and a second group of UEs (including the second UE 515) that are using the second model. The network node 505 may generate the third model based at least in part on one or more characteristics of the combined group of UEs. In some aspects, the network node 505 may maintain training data (e.g., single training data or multiple sets of training data) for the first UE 510 and the second UE 515 using the third model.

In some aspects, generating the third model may comprise combining one or more layers of the first model and the second model. Additional details regarding this feature are described below in connection with FIG. 8.

As described above, the network node 505 may not be able to easily adjust or update federated learning models since the network node 505 does not have access to the raw or local data. In some cases, it may not be possible to perform model combining without the raw or local data. Using the techniques and apparatuses described herein, the network node 505 may be configured to perform model combining using parameter updates, such as gradient updates or error metrics, received from the first UE 510 or the second UE 515. This may allow the network node 505 to perform the model combining even though the network node 505 does not have access to the raw or local data. Thus, the benefits of federated learning, such as local computing and data privacy, may be maintained, while the drawbacks, such as the difficulty in performing model updating, may be reduced or eliminated.

As indicated above, FIG. 6 is provided as an example. Other examples may differ from what is described with regard to FIG. 6.

Figure 7:
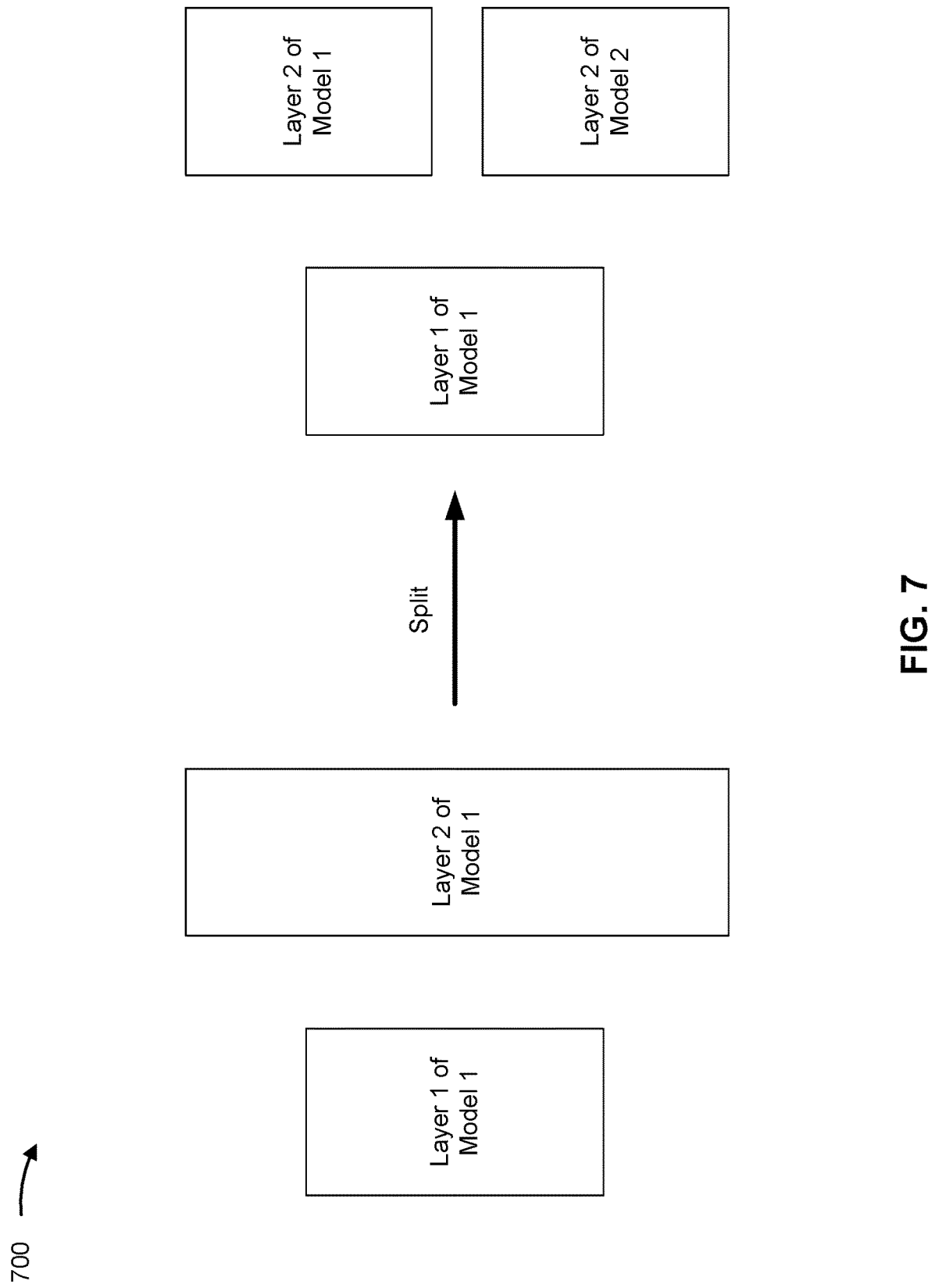
FIG. 7 is a diagram illustrating an example associated with model layer splitting, in accordance with the present disclosure.

FIG. 7 is a diagram illustrating an example 700 of model layer splitting, in accordance with the present disclosure.

As described herein, the network node 505 may be configured to split a first model into a second model and a third model. For example, the first model may be originally configured for use by a group of UEs that includes the first UE 510 and the second UE 515. The network node 505 may generate a second model for a first subgroup of UEs that includes the first UE 510 and a third model for a second subgroup of UEs that includes the second UE 515.

In some aspects, the models may comprise one or more layers. For example, the first model may comprise a first layer and a second layer. In some aspects, the layers may be used for different purposes or may correspond to different functionalities of the first UE 510 and the second UE 515. For example, the first layer may be used for beam prediction in a first area (e.g., a densely populated area) and the second layer may be used for beam production in a second area (e.g., a sparsely populated area). In some aspects, the feedback (e.g., the parameter updates) may be layer-specific. For example, the first UE 510 may be configured to report an error metric using the first layer if the error metric is greater than a first error metric threshold, and may be configured to report the error metric using the second layer if the error metric is greater than a second error metric threshold.

In some aspects, the network node 505 may determine to perform model splitting (e.g., to generate the second model and the third model using the first model) for one or more model layers. In some aspects, the network node 505 may determine (e.g., based at least in part on the parameter updates) that the first layer of the first model does not need to be split, but that the second layer of the first model does need to be split. Using the example above, the network node 505 may determine that the data distributions using the first layer in the densely populated area are similar, but that the data distributions using the second layer in the sparsely populated area are different.

As shown in the example 700, based at least in part on the model splitting, the first UE 510 and the second UE 515 may be configured to use the same model for the first layer. Since the data distributions for the first layer of the first model are similar, the first model can continue to be used for the first layer. However, the first UE 510 and the second UE 515 may be configured to use different models for the second layer. For example, the first UE 510 may use the second layer of the first model and the second UE 515 may use a second layer of a second model. Since the data distributions for the second layer of the first model and the second layer of the second model are different, splitting the models for the second layer may be beneficial. For example, the individual models may allow for better beam prediction than the combined models.

As indicated above, FIG. 7 is provided as an example. Other examples may differ from what is described with regard to FIG. 7.

Figure 8:
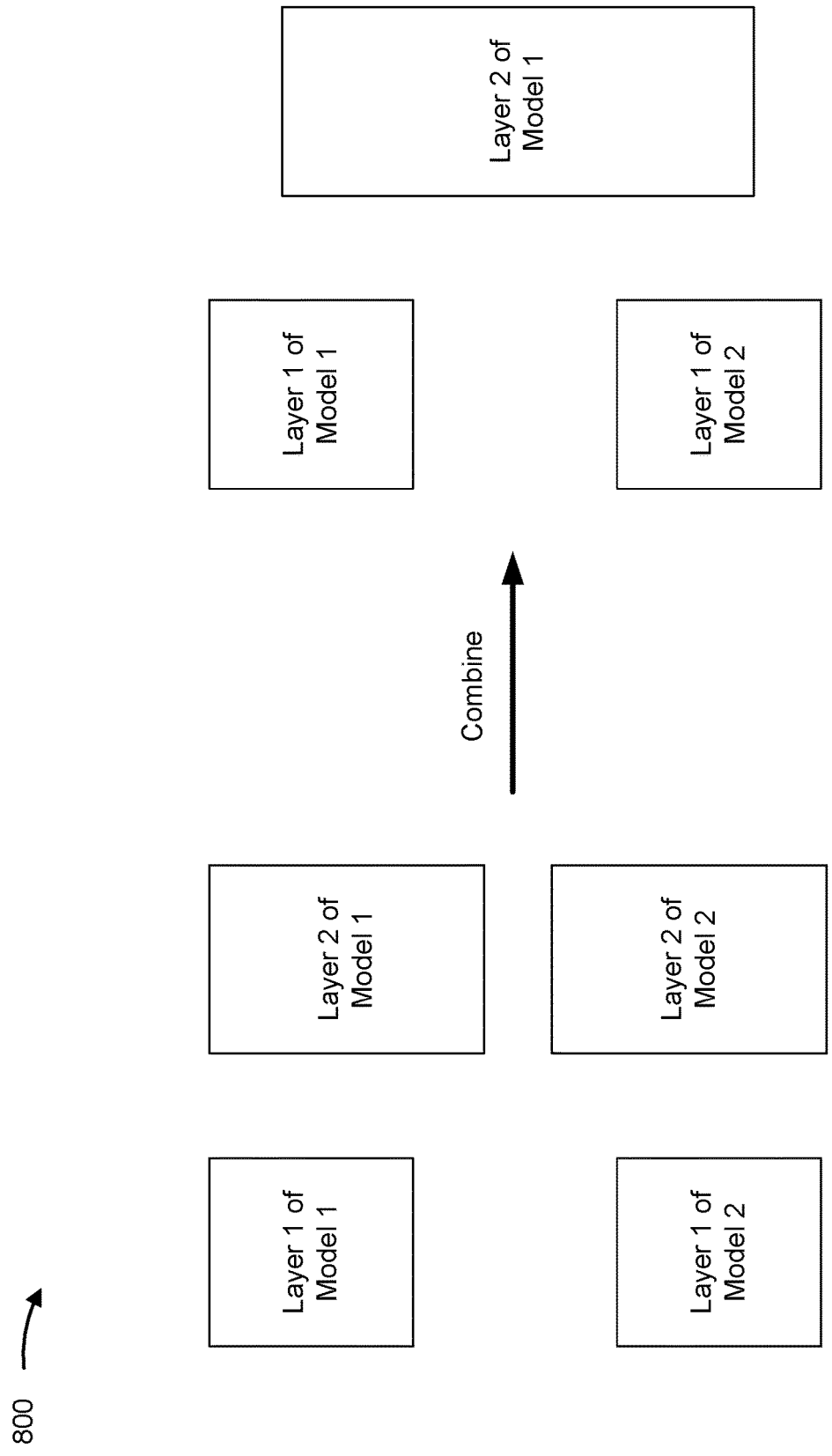
FIG. 8 is a diagram illustrating an example associated with model layer combining, in accordance with the present disclosure.

FIG. 8 is a diagram illustrating an example 800 of model layer combining, in accordance with the present disclosure.

In some aspects, the network node 505 may determine to perform model combining (e.g., to generate the third model using the first model and the second model) for one or more model layers. In some aspects, the network node 505 may determine (e.g., based at least in part on the parameter updates) that the first layers of the first model and the second model should not be combined, but that the second layers of the first model and the second model should be combined. Using the example above, the network node 505 may determine that the data distributions using the first layer in the densely populated area are different, but that the data distributions using the second layer in the sparsely populated area are similar.

As shown in the example 800, the first UE 510 and the second UE 515 may be configured to use different models for the first layer. Since the data distributions for the first layers of the first model and the second model are different, the first layers of the first model and the second model should not be combined. However, based at least in part on the model combining, the first UE 510 and the second UE 515 may both use the second layer of the first model. Since the data distributions for the second layer are similar, combining the models (or using the same model) may be beneficial. For example, the combined model may require fewer resources than the individual models and may be easier to update.

As indicated above, FIG. 8 is provided as an example. Other examples may differ from what is described with regard to FIG. 8.

Figure 9:
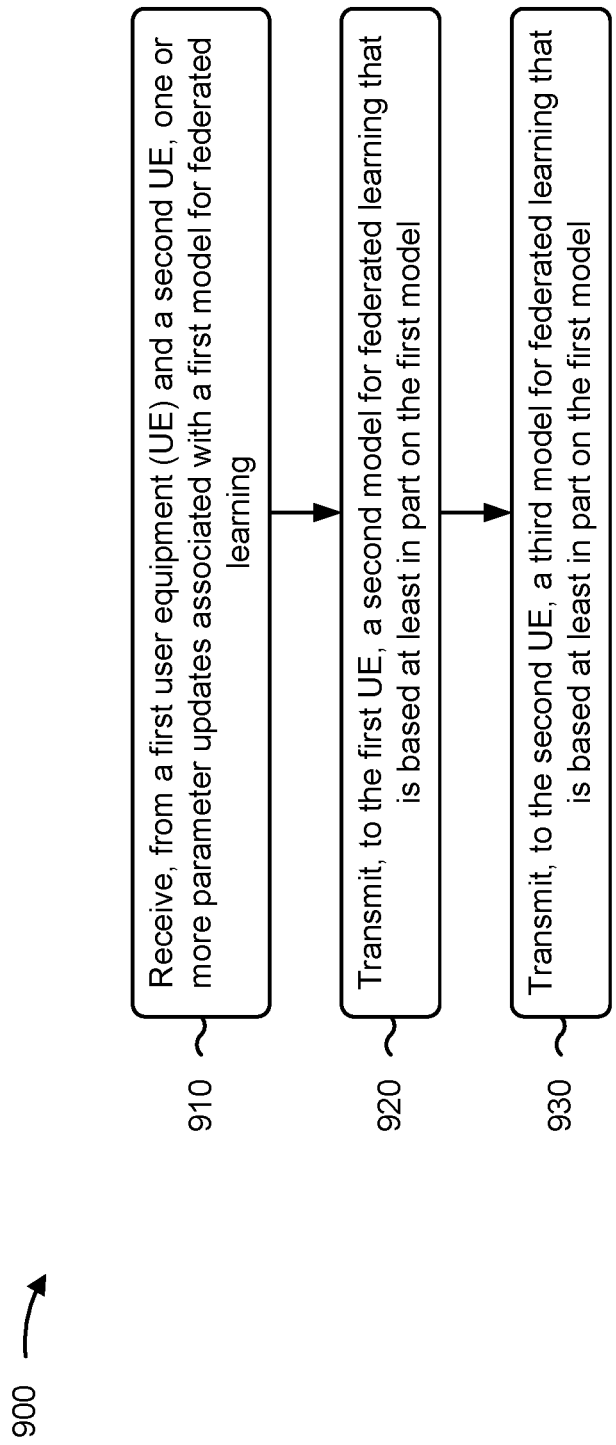
FIG. 9 is a diagram illustrating an example process associated with model layer splitting, in accordance with the present disclosure.

FIG. 9 is a diagram illustrating an example process 900 performed, for example, by a network node, in accordance with the present disclosure. Example process 900 is an example where the network node (e.g., network node 505) performs operations associated with federated learning model splitting and combining.

As shown in FIG. 9, in some aspects, process 900 may include receiving, from a first UE and a second UE, one or more parameter updates associated with a first model for federated learning (block 910). For example, the network node (e.g., using communication manager 1108 and/or reception component 1102, depicted in FIG. 11) may receive, from a first UE and a second UE, one or more parameter updates associated with a first model for federated learning, as described above.

As further shown in FIG. 9, in some aspects, process 900 may include transmitting, to the first UE, a second model for federated learning that is based at least in part on the first model (block 920). For example, the network node (e.g., using communication manager 1108 and/or transmission component 1104, depicted in FIG. 11) may transmit, to the first UE, a second model for federated learning that is based at least in part on the first model, as described above.

As further shown in FIG. 9, in some aspects, process 900 may include transmitting, to the second UE, a third model for federated learning that is based at least in part on the first model (block 930). For example, the network node (e.g., using communication manager 1108 and/or transmission component 1104, depicted in FIG. 11) may transmit, to the second UE, a third model for federated learning that is based at least in part on the first model, as described above.

Process 900 may include additional aspects, such as any single aspect or any combination of aspects described below and/or in connection with one or more other processes described elsewhere herein.

In a first aspect, process 900 includes generating the second model and the third model based at least in part on the first model.

In a second aspect, alone or in combination with the first aspect, generating the second model and the third model based at least in part on the first model comprises splitting the first model into the second model and the third model.

In a third aspect, alone or in combination with one or more of the first and second aspects, receiving the one or more parameter updates comprises receiving a first gradient from the first UE and receiving a second gradient from the second UE.

In a fourth aspect, alone or in combination with one or more of the first through third aspects, process 900 includes generating a group of parameter updates that includes a parameter update from the first UE and a parameter update from the second UE, and generating the second model and the third model based at least in part on the group of parameter updates.

In a fifth aspect, alone or in combination with one or more of the first through fourth aspects, generating the second model and the third model based at least in part on the group of parameter updates comprises determining an average parameter update based at least in part on the group of parameter updates, generating the second model based at least in part on a difference between the parameter update from the first UE and the average parameter update, and generating the third model based at least in part on a difference between the parameter update from the second UE and the average parameter update.

In a sixth aspect, alone or in combination with one or more of the first through fifth aspects, process 900 includes transmitting information that enables the first UE and the second UE to respectively generate one or more error metrics based at least in part on the first model.

In a seventh aspect, alone or in combination with one or more of the first through sixth aspects, receiving the one or more parameter updates comprises receiving a first error metric from the first UE and receiving a second error metric from the second UE.

In an eighth aspect, alone or in combination with one or more of the first through seventh aspects, the error metric is a low complexity error metric.

In a ninth aspect, alone or in combination with one or more of the first through eighth aspects, the information that enables the first UE and the second UE to generate the one or more error metrics includes a threshold error metric.

In a tenth aspect, alone or in combination with one or more of the first through ninth aspects, receiving the one or more parameter updates comprises receiving a first error metric from the first UE based at least in part on a parameter update measurement from the first UE being greater than the threshold error metric, or receiving a second error metric from the second UE based at least in part on a parameter update measurement from the second UE being greater than the threshold error metric.

In an eleventh aspect, alone or in combination with one or more of the first through tenth aspects, process 900 includes broadcasting the threshold error metric to a plurality of UEs that includes the first UE and the second UE.

In a twelfth aspect, alone or in combination with one or more of the first through eleventh aspects, process 900 includes maintaining first training information associated with the second model and second training information associated with the third model.

In a thirteenth aspect, alone or in combination with one or more of the first through twelfth aspects, the first model comprises a first layer and a second layer, and receiving the one or more parameter updates comprises receiving one or more parameter updates associated with the first layer.

In a fourteenth aspect, alone or in combination with one or more of the first through thirteenth aspects, the second model and the third model are based at least in part on the first layer of the first model.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
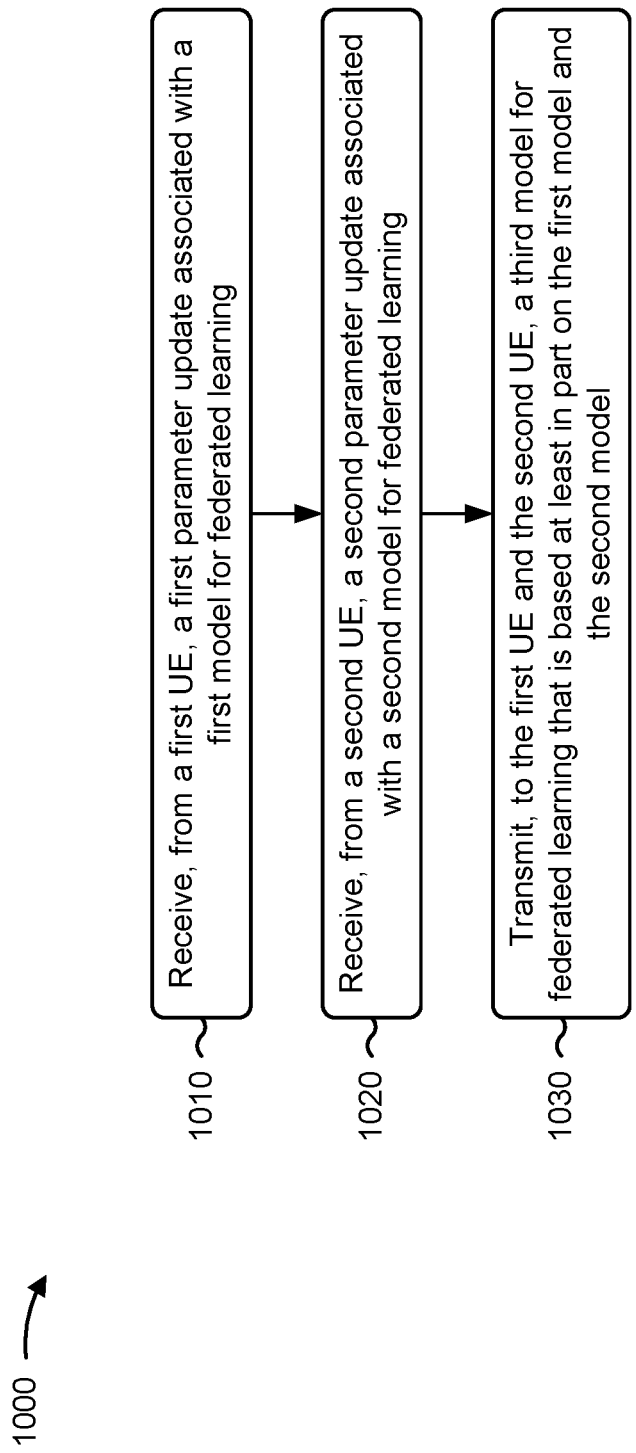
FIG. 10 is a diagram illustrating an example process associated with model layer combining, in accordance with the present disclosure.

FIG. 10 is a diagram illustrating an example process 1000 performed, for example, by a network node, in accordance with the present disclosure. Example process 1000 is an example where the network node (e.g., network node 505) performs operations associated with federated learning model splitting and combining.

As shown in FIG. 10, in some aspects, process 1000 may include receiving, from a first UE, a first parameter update associated with a first model for federated learning (block 1010). For example, the network node (e.g., using communication manager 1108 and/or reception component 1102, depicted in FIG. 11) may receive, from a first UE, a first parameter update associated with a first model for federated learning, as described above.

As further shown in FIG. 10, in some aspects, process 1000 may include receiving, from a second UE, a second parameter update associated with a second model for federated learning (block 1020). For example, the network node (e.g., using communication manager 1108 and/or reception component 1102, depicted in FIG. 11) may receive, from a second UE, a second parameter update associated with a second model for federated learning, as described above.

As further shown in FIG. 10, in some aspects, process 1000 may include transmitting, to the first UE and the second UE, a third model for federated learning that is based at least in part on the first model and the second model (block 1030). For example, the network node (e.g., using communication manager 1108 and/or transmission component 1104, depicted in FIG. 11) may transmit, to the first UE and the second UE, a third model for federated learning that is based at least in part on the first model and the second model, as described above.

Process 1000 may include additional aspects, such as any single aspect or any combination of aspects described below and/or in connection with one or more other processes described elsewhere herein.

In a first aspect, process 1000 includes generating the third model based at least in part on the first model and the second model.

In a second aspect, alone or in combination with the first aspect, generating the third model based at least in part on the first model and the second model comprises combining the first model and the second model.

In a third aspect, alone or in combination with one or more of the first and second aspects, the first UE is configured with the first model and the second model, and the second UE is configured with the first model and the second model.

In a fourth aspect, alone or in combination with one or more of the first through third aspects, the first model is the primary model for the first UE, and the second model is the primary model for the second UE.

In a fifth aspect, alone or in combination with one or more of the first through fourth aspects, the second model is the primary model for the first UE, and the first model is the primary model for the second UE.

In a sixth aspect, alone or in combination with one or more of the first through fifth aspects, process 1000 includes transmitting, to the first UE, information for determining the first parameter update based at least in part on the first model, and transmitting, to the second UE, information for determining the second parameter update based at least in part on the second model.

In a seventh aspect, alone or in combination with one or more of the first through sixth aspects, the information for determining the first parameter update comprises information for determining the first parameter update based at least in part on a first average parameter update, and the information for determining the second parameter update comprises information for determining the second parameter update based at least in part on a second average parameter update.

In an eighth aspect, alone or in combination with one or more of the first through seventh aspects, the first parameter update includes a first error metric, and the second parameter update includes a second error metric.

In a ninth aspect, alone or in combination with one or more of the first through eighth aspects, the information for determining the first parameter update comprises information for determining the first error metric based at least in part on a first threshold error metric, and the information for determining the second parameter update comprises information for determining the second error metric based at least in part on a second threshold error metric.

In a tenth aspect, alone or in combination with one or more of the first through ninth aspects, the first parameter update and the second parameter update are based at least in part on a difference between an output of the first model and an output of the second model.

In an eleventh aspect, alone or in combination with one or more of the first through tenth aspects, process 1000 includes maintaining, for the first UE and the second UE, training information associated with the third model.

In a twelfth aspect, alone or in combination with one or more of the first through eleventh aspects, the first model comprises a first layer of the first model and a second layer of the first model, and the second model comprises a first layer of the second model and a second layer of the second model, wherein receiving the first parameter update comprises receiving a first parameter update associated with the second layer of the first model, and wherein receiving the second parameter update comprises receiving a second parameter update associated with the second layer of the second model.

In a thirteenth aspect, alone or in combination with one or more of the first through twelfth aspects, the third model is based at least in part on the second layer of the first model and the second layer of the second model.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
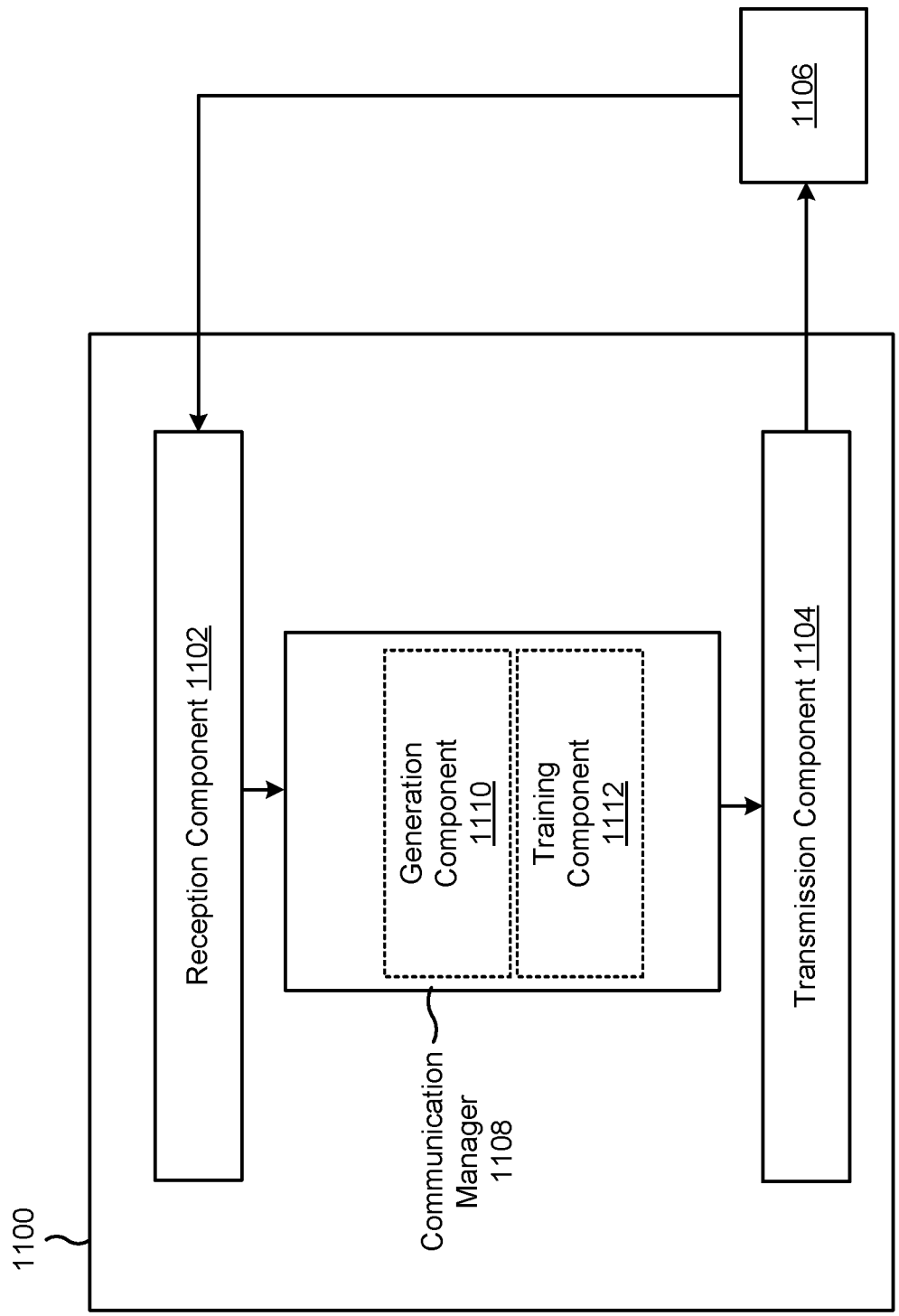
FIG. 11 is a diagram of an example apparatus for wireless communication, in accordance with the present disclosure.

FIG. 11 is a diagram of an example apparatus 1100 for wireless communication. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 1108. In some aspects, the communication manager 1108 may include some or all of the features of the communication manager 150. The communication manager 1108 may include one or more of a generation component 1110, or a training component 1112, among other examples.

In some aspects, the apparatus 1100 may be configured to perform one or more operations described herein in connection with FIGS. 5-8. Additionally, or alternatively, the apparatus 1100 may be configured to perform one or more processes described herein, such as process 900 of FIG. 9, process 1000 of FIG. 10, or a combination thereof. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The reception component 1102 may receive, from a first UE and a second UE, one or more parameter updates associated with a first model for federated learning. The transmission component 1104 may transmit, to the first UE, a second model for federated learning that is based at least in part on the first model. The transmission component 1104 may transmit, to the second UE, a third model for federated learning that is based at least in part on the first model.

The generation component 1110 may generate the second model and the third model based at least in part on the first model.

The generation component 1110 may generate a group of parameter updates that includes a parameter update from the first UE and a parameter update from the second UE.

The generation component 1110 may generate the second model and the third model based at least in part on the group of parameter updates.

The transmission component 1104 may transmit information that enables the first UE and the second UE to respectively generate one or more error metrics based at least in part on the first model.

The transmission component 1104 may broadcast the threshold error metric to a plurality of UEs that includes the first UE and the second UE.

The training component 1112 may maintain first training information associated with the second model and second training information associated with the third model.

The reception component 1102 may receive, from a first UE, a first parameter update associated with a first model for federated learning. The reception component 1102 may receive, from a second UE, a second parameter update associated with a second model for federated learning. The transmission component 1104 may transmit, to the first UE and the second UE, a third model for federated learning that is based at least in part on the first model and the second model.

The generation component 1110 may generate the third model based at least in part on the first model and the second model.

The transmission component 1104 may transmit, to the first UE, information for determining the first parameter update based at least in part on the first model.

The transmission component 1104 may transmit, to the second UE, information for determining the second parameter update based at least in part on the second model.

The training component 1112 may maintain, for the first UE and the second UE, training information associated with the third model.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a network node, comprising: receiving, from a first user equipment (UE) and a second UE, one or more parameter updates associated with a first model for federated learning; transmitting, to the first UE, a second model for federated learning that is based at least in part on the first model; and transmitting, to the second UE, a third model for federated learning that is based at least in part on the first model.

Aspect 2: The method of Aspect 1, further comprising generating the second model and the third model based at least in part on the first model.

Aspect 3: The method of Aspect 2, wherein generating the second model and the third model based at least in part on the first model comprises splitting the first model into the second model and the third model.

Aspect 4: The method of any of Aspects 1-3, wherein receiving the one or more parameter updates comprises receiving a first gradient from the first UE and receiving a second gradient from the second UE.

Aspect 5: The method of any of Aspects 1-4 Aspect 1, further comprising: generating a group of parameter updates that includes a parameter update from the first UE and a parameter update from the second UE, and generating the second model and the third model based at least in part on the group of parameter updates.

Aspect 6: The method of Aspect 5, wherein generating the second model and the third model based at least in part on the group of parameter updates comprises: determining an average parameter update based at least in part on the group of parameter updates; generating the second model based at least in part on a difference between the parameter update from the first UE and the average parameter update; and generating the third model based at least in part on a difference between the parameter update from the second UE and the average parameter update.

Aspect 7: The method of any of Aspects 1-6, further comprising transmitting information that enables the first UE and the second UE to respectively generate one or more error metrics based at least in part on the first model.

Aspect 8: The method of Aspect 7, wherein receiving the one or more parameter updates comprises receiving a first error metric from the first UE and receiving a second error metric from the second UE.

Aspect 9: The method of Aspect 7, wherein the error metric is a low complexity error metric.

Aspect 10: The method of Aspect 7, wherein the information that enables the first UE and the second UE to generate the one or more error metrics includes a threshold error metric.

Aspect 11: The method of Aspect 10, wherein receiving the one or more parameter updates comprises: receiving a first error metric from the first UE based at least in part on a parameter update measurement from the first UE being greater than the threshold error metric; or receiving a second error metric from the second UE based at least in part on a parameter update measurement from the second UE being greater than the threshold error metric.

Aspect 12: The method of Aspect 10, further comprising broadcasting the threshold error metric to a plurality of UEs that includes the first UE and the second UE.

Aspect 13: The method of any of Aspects 1-12, further comprising maintaining first training information associated with the second model and second training information associated with the third model.

Aspect 14: The method of any of Aspects 1-13, wherein the first model comprises a first layer and a second layer, and wherein receiving the one or more parameter updates comprises receiving one or more parameter updates associated with the first layer.

Aspect 15: The method of Aspect 14, wherein the second model and the third model are based at least in part on the first layer of the first model.

Aspect 16: A method of wireless communication performed by a network node, comprising: receiving, from a first user equipment (UE), a first parameter update associated with a first model for federated learning; receiving, from a second UE, a second parameter update associated with a second model for federated learning; and transmitting, to the first UE and the second UE, a third model for federated learning that is based at least in part on the first model and the second model.

Aspect 17: The method of Aspect 16, further comprising generating the third model based at least in part on the first model and the second model.

Aspect 18: The method of Aspect 17, wherein generating the third model based at least in part on the first model and the second model comprises combining the first model and the second model.

Aspect 19: The method of any of Aspects 16-18, wherein the first UE is configured with the first model and the second model, and the second UE is configured with the first model and the second model.

Aspect 20: The method of Aspect 19, wherein the first model is the primary model for the first UE, and the second model is the primary model for the second UE.

Aspect 21: The method of Aspect 19, wherein the second model is the primary model for the first UE, and the first model is the primary model for the second UE.

Aspect 22: The method of Aspect 21, further comprising: transmitting, to the first UE, information for determining the first parameter update based at least in part on the first model; and transmitting, to the second UE, information for determining the second parameter update based at least in part on the second model.

Aspect 23: The method of Aspect 22, wherein the information for determining the first parameter update comprises information for determining the first parameter update based at least in part on a first average parameter update, and the information for determining the second parameter update comprises information for determining the second parameter update based at least in part on a second average parameter update.

Aspect 24: The method of Aspect 22, wherein the first parameter update includes a first error metric, and the second parameter update includes a second error metric.

Aspect 25: The method of Aspect 24, wherein the information for determining the first parameter update comprises information for determining the first error metric based at least in part on a first threshold error metric, and the information for determining the second parameter update comprises information for determining the second error metric based at least in part on a second threshold error metric.

Aspect 26: The method of Aspect 19, wherein the first parameter update and the second parameter update are based at least in part on a difference between an output of the first model and an output of the second model.

Aspect 27: The method of any of Aspects 16-26, further comprising maintaining, for the first UE and the second UE, training information associated with the third model.

Aspect 28: The method of any of Aspects 16-26, wherein the first model comprises a first layer of the first model and a second layer of the first model, and the second model comprises a first layer of the second model and a second layer of the second model, wherein receiving the first parameter update comprises receiving a first parameter update associated with the second layer of the first model, and wherein receiving the second parameter update comprises receiving a second parameter update associated with the second layer of the second model.

Aspect 29: The method of Aspect 28, wherein the third model is based at least in part on the second layer of the first model and the second layer of the second model.

Aspect 30: An apparatus for wireless communication at a device, comprising a processor; memory coupled with the processor; and instructions stored in the memory and executable by the processor to cause the apparatus to perform the method of one or more of Aspects 1-15.

Aspect 31: A device for wireless communication, comprising a memory and one or more processors coupled to the memory, the one or more processors configured to perform the method of one or more of Aspects 1-15.

Aspect 32: An apparatus for wireless communication, comprising at least one means for performing the method of one or more of Aspects 1-15.

Aspect 33: A non-transitory computer-readable medium storing code for wireless communication, the code comprising instructions executable by a processor to perform the method of one or more of Aspects 1-15.

Aspect 34: A non-transitory computer-readable medium storing a set of instructions for wireless communication, the set of instructions comprising one or more instructions that, when executed by one or more processors of a device, cause the device to perform the method of one or more of Aspects 1-15.

Aspect 35: An apparatus for wireless communication at a device, comprising a processor; memory coupled with the processor; and instructions stored in the memory and executable by the processor to cause the apparatus to perform the method of one or more of Aspects 16-29.

Aspect 36: A device for wireless communication, comprising a memory and one or more processors coupled to the memory, the one or more processors configured to perform the method of one or more of Aspects 16-29.

Aspect 37: An apparatus for wireless communication, comprising at least one means for performing the method of one or more of Aspects 16-29.

Aspect 38: A non-transitory computer-readable medium storing code for wireless communication, the code comprising instructions executable by a processor to perform the method of one or more of Aspects 16-29.

Aspect 39: A non-transitory computer-readable medium storing a set of instructions for wireless communication, the set of instructions comprising one or more instructions that, when executed by one or more processors of a device, cause the device to perform the method of one or more of Aspects 16-29.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a network node, comprising:
   one or more memories; and
   one or more processors coupled to the one or more memories, the one or more processors configured to:
      transmit, to a first user equipment (UE) and a second UE, a first model for federated learning;

receive, from the first UE and the second UE, one or more parameter updates associated with the first model for federated learning;

transmit, to the first UE, a second model for federated learning that is based at least in part on the first model and the one or more parameter updates; and transmit, to the second UE, a third model for federated learning that is based at least in part on the first model, wherein the third model is different from the second model.

2. The apparatus of claim 1, wherein the one or more processors are further configured to generate the second model and the third model based at least in part on the first model.

3. The apparatus of claim 2, wherein the one or more processors, to generate the second model and the third model based at least in part on the first model, are configured to split the first model into the second model and the third model.

4. The apparatus of claim 1, wherein the one or more processors, to receive the one or more parameter updates, are configured to receive a first gradient from the first UE and receive a second gradient from the second UE.

5. The apparatus of claim 1, wherein the one or more processors are further configured to:
generate a group of parameter updates that includes a parameter update from the first UE and a parameter update from the second UE, and
generate the second model and the third model based at least in part on the group of parameter updates.

6. The apparatus of claim 5, wherein the one or more processors, to generate the second model and the third model based at least in part on the group of parameter updates, are configured to:
determine an average parameter update based at least in part on the group of parameter updates;
generate the second model based at least in part on a difference between the parameter update from the first UE and the average parameter update; and
generate the third model based at least in part on a difference between the parameter update from the second UE and the average parameter update.

7. The apparatus of claim 1, wherein the one or more processors are further configured to transmit information that enables the first UE and the second UE to respectively generate one or more error metrics based at least in part on the first model.

8. The apparatus of claim 7, wherein the one or more processors, to receive the one or more parameter updates, are configured to receive a first error metric from the first UE and receive a second error metric from the second UE.

9. The apparatus of claim 7, wherein the information that enables the first UE and the second UE to generate the one or more error metrics includes a threshold error metric.

10. The apparatus of claim 1, wherein the one or more processors are further configured to maintain first training information associated with the second model and second training information associated with the third model.

11. The apparatus of claim 1, wherein the first model comprises a first layer and a second layer, and wherein receiving the one or more parameter updates comprises receiving one or more parameter updates associated with the first layer.

12. The apparatus of claim 11, wherein the second model and the third model are based at least in part on the first layer of the first model.

13. An apparatus for wireless communication at a network node, comprising:
one or more memories; and
one or more processors coupled to the one or more memories, the one or more processors configured to:
transmit, to a first user equipment (UE), a first model for federated learning;
transmit, to a second UE, a second model for federated learning, wherein the second model is different from the first model;
receive, from the first UE, a first parameter update associated with the first model;
receive, from the second UE, a second parameter update associated with the second model; and
transmit, to the first UE and the second UE, a third model for federated learning that is based at least in part on the first model, the second model, the first parameter update, and the second parameter update.

14. The apparatus of claim 13, wherein the one or more processors are further configured to generate the third model based at least in part on the first model and the second model.

15. The apparatus of claim 14, wherein the one or more processors, to generate the third model based at least in part on the first model and the second model, are configured to combine the first model and the second model.

16. The apparatus of claim 13, wherein the first UE is configured with the first model and the second model, and the second UE is configured with the first model and the second model.

17. The apparatus of claim 16, wherein the first model is the primary model for the first UE, and the second model is the primary model for the second UE.

18. The apparatus of claim 16, wherein the second model is the primary model for the first UE, and the first model is the primary model for the second UE.

19. The apparatus of claim 18, wherein the one or more processors are further configured to:
transmit, to the first UE, information for determining the first parameter update based at least in part on the first model; and
transmit, to the second UE, information for determining the second parameter update based at least in part on the second model.

20. The apparatus of claim 19, wherein the information for determining the first parameter update comprises information for determining the first parameter update based at least in part on a first average parameter update, and the information for determining the second parameter update comprises information for determining the second parameter update based at least in part on a second average parameter update.

21. The apparatus of claim 19, wherein the first parameter update includes a first error metric, and the second parameter update includes a second error metric.

22. The apparatus of claim 13, wherein the one or more processors are further configured to maintain, for the first UE and the second UE, training information associated with the third model.

23. The apparatus of claim 13, wherein the first model comprises a first layer of the first model and a second layer of the first model, and the second model comprises a first layer of the second model and a second layer of the second model, wherein receiving the first parameter update comprises receiving a first parameter update associated with the second layer of the first model, and wherein receiving the second parameter update comprises receiving a second parameter update associated with the second layer of the second model.

24. The apparatus of claim 23, wherein the third model is based at least in part on the second layer of the first model and the second layer of the second model.

25. A method of wireless communication performed by a network node, comprising:
- transmitting, to a first user equipment (UE) and a second UE, a first model for federated learning;
- receiving, from the first UE and the second UE, one or more parameter updates associated with the first model for federated learning;
- transmitting, to the first UE, a second model for federated learning that is based at least in part on the first model and the one or more parameter updates; and
- transmitting, to the second UE, a third model for federated learning that is based at least in part on the first model, wherein the third model is different from the second model.

26. The method of claim 25, further comprising generating the second model and the third model based at least in part on the first model.

27. The method of claim 26, wherein generating the second model and the third model based at least in part on the first model comprises splitting the first model into the second model and the third model.

28. A method of wireless communication performed by a network node, comprising:
- transmitting, to a first user equipment (UE), a first model for federated learning;
- transmitting, to a second UE, a second model for federated learning, wherein the second model is different from the first model;
- receiving, from the first UE, a first parameter update associated with the first model;
- receiving, from the second UE, a second parameter update associated with the second model; and
- transmitting, to the first UE and the second UE, a third model for federated learning that is based at least in part on the first model, the second model, the first parameter update, and the second parameter update.

29. The method of claim 28, further comprising generating the third model based at least in part on the first model and the second model.

30. The method of claim 29, wherein generating the third model based at least in part on the first model and the second model comprises combining the first model and the second model.

* * * * *